United States Patent
Perko

(10) Patent No.: US 7,013,828 B1
(45) Date of Patent: Mar. 21, 2006

(54) BUOYANT TUBE SHIP

(76) Inventor: David Perko, 1067 Chenille Cir., Weston, FL (US) 33327

( * ) Notice: Subject to any disclaimer, the term of this patent is extended or adjusted under 35 U.S.C. 154(b) by 0 days.

(21) Appl. No.: 10/701,338

(22) Filed: Nov. 4, 2003

Related U.S. Application Data

(60) Provisional application No. 60/423,682, filed on Nov. 4, 2002.

(51) Int. Cl.
*B63B 7/00* (2006.01)

(52) U.S. Cl. .......................... 114/345; 441/40
(58) Field of Classification Search ........... 114/345, 114/352, 61.1, 61.25; 441/40, 41; 440/80, 440/81
See application file for complete search history.

(56) References Cited

U.S. PATENT DOCUMENTS

| | | | | |
|---|---|---|---|---|
| 4,762,078 A | * | 8/1988 | Palmer, Jr. | 114/61.25 |
| 5,014,639 A | * | 5/1991 | Day | 114/352 |
| 5,367,974 A | * | 11/1994 | Moraga et al. | 114/345 |
| 5,618,213 A | * | 4/1997 | Nanami | 440/80 |
| 6,213,042 B1 | * | 4/2001 | Delfosse | 114/61.1 |
| 6,582,264 B1 | * | 6/2003 | Brown | 441/40 |

* cited by examiner

*Primary Examiner*—Lars A. Olson
(74) *Attorney, Agent, or Firm*—Frank L. Kubler

(57) ABSTRACT

A tube ship includes at least three closed gas containers fastened into close lateral proximity to define an interstitial space between the containers which functions as a ship hold for retaining cargo, crew or passengers. The gas containers preferably are all tubes having substantially circular cross-sections and preferably being fastened together by a looped outer skin of sheet wrap material, which also protects the tubes from damaging sunlight and from high speed water friction. The tubes are filled with helium to provide extreme buoyancy and also function as the overall framework of the ship. A high power turbine motor preferably drives the ship so that the hull hydroplanes.

10 Claims, 3 Drawing Sheets

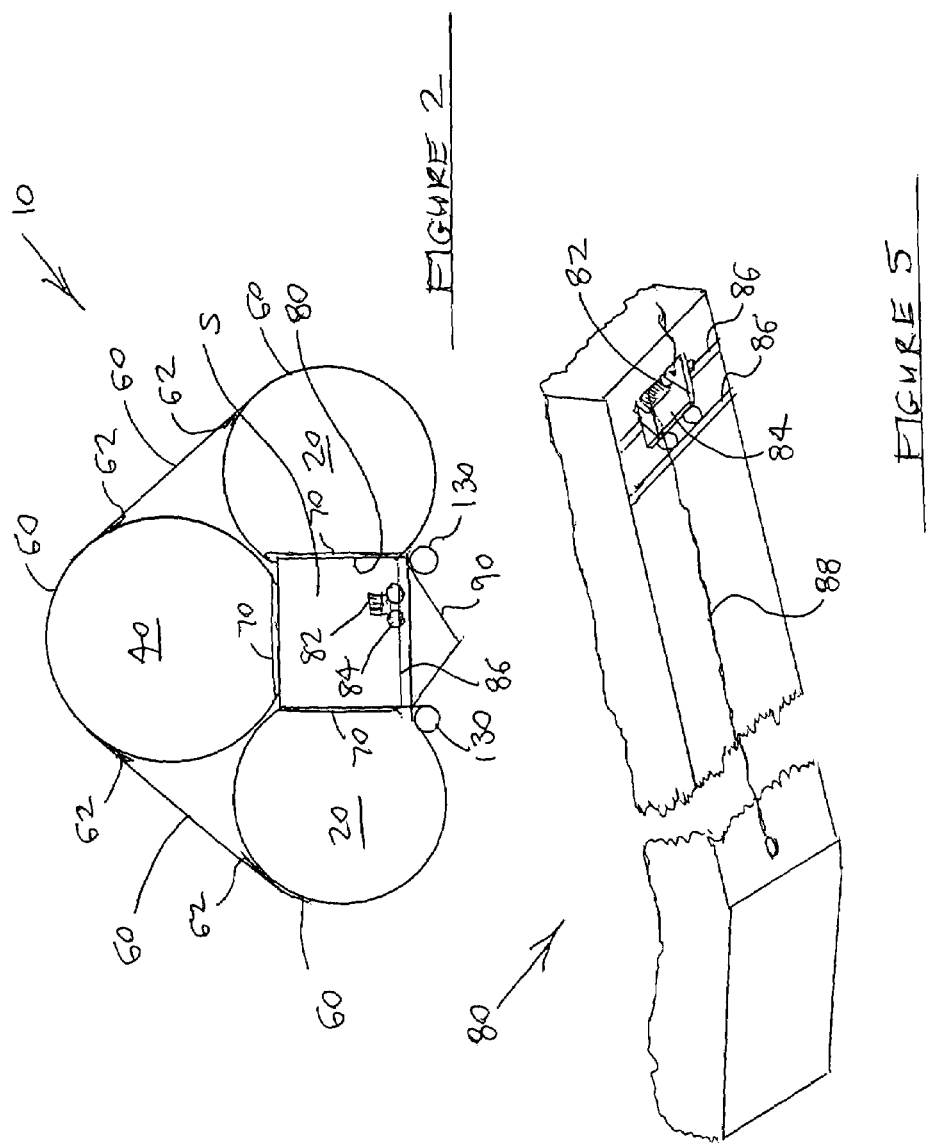

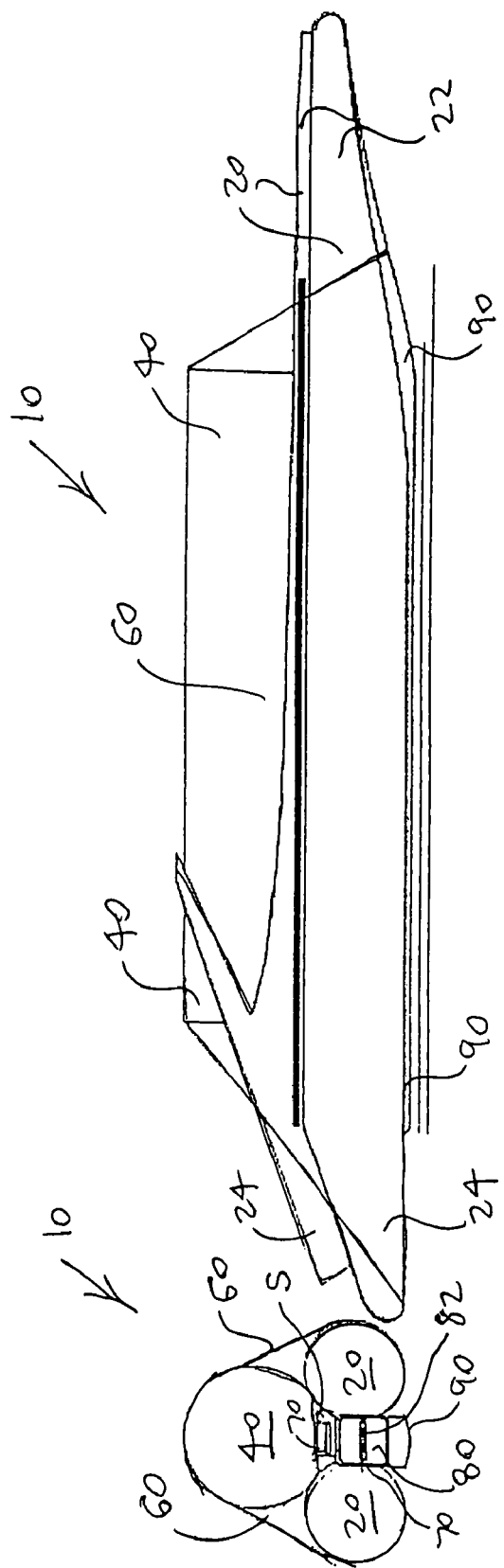

BUOYANT TUBE SHIP

This application continues from provisional application Ser. No. 60/423,682, filed on Nov. 4, 2002.

BACKGROUND OF THE INVENTION

1. Field of the Invention

The present invention relates generally to the field of ship design and construction. More specifically the present invention relates to a water craft preferably in the form of a ship and constructed of at least three closed gas containers fastened into close lateral proximity to define an interstitial space between the containers which functions as a ship hold for retaining cargo, crew or passengers. The gas containers preferably are all tubes having substantially circular cross-sections and preferably being fastened together by a looped outer skin of sheet wrap material, which also protects the tubes from damaging sunlight and from high speed water friction. The hull tubes preferably have upwardly angling hull tube forward ends to approximate the conventional shape of a ship bow and have downwardly angling hull tube rearward ends. In the preferred configuration, two hull tubes rest on the water surface and a third cover tube is centered over and nests on top of and between the two hull tubes, and the hull tubes preferably are laterally spaced apart to increase hold space. The tubes thus both form the overall structure of the ship and also provide the necessary buoyancy for the ship to float.

A hull shell preferably formed of aluminum is fastened underneath and cradles and retains the hull tubes to add structural integrity to the ship and to provide a rugged, durable hull of a shape suited to the surface characteristics of the body of water to be crossed.

Ordinary buoyancy preferably is increased to extreme buoyancy by filling the tubes with a lighter-than-air gas such as helium. The buoyancy added by the use of helium reduces the draft of the ship and thus reduces drag so that the ship can travel at very high speed and hydroplane and can carry a heavier cargo or passenger load with a certain given level of propulsive power. The ship preferably is driven by two counter rotating propellers.

2. Description of the Prior Art:

For millennia there have been ships for carrying cargo and passengers over various bodies of water. A problem with conventional ships of contemporary design has been their slow speed compared with air and land transport vehicles. Faster water craft have long existed, such as small, high powered speed boats, air boats and hydrofoils, but have not been suited to large scale transport. Simply placing a large engine on a conventional cargo or passenger ship is not entirely practical, because the deep draft of the ship hull creates a great deal of drag and makes the energy costs excessive, while not achieving sufficient speed to compete with alternative forms of rapid transport. Hydrofoil boats can achieve high speed by lifting the hull out of the water and minimizing drag, but do not operate efficiently at full ship size.

It is thus an object of the present invention to provide a water craft for carrying cargo or passengers which has a very slight draft so that the craft can move through the water with extremely minimal drag, so that high speed can be achieved with a full load and with minimal fuel consumption.

It is another object of the present invention to provide such a water craft which achieves an exceptionally shallow draft by retaining large quantities of a lighter-than-air gas.

It is still another object of the present invention to provide such a water craft which can be built on a large scale economically, in the form of laterally adjacent parallel tubes formed of light sheet material enclosing between them a hold area.

It is finally an object of the present invention to provide such a water craft in which a cover tube is provided and nests on top of and between lower hull tubes and thus both closes and seals the hold area to keep out rain and sun and also adds buoyancy because of lighter-than-air gas.

SUMMARY OF THE INVENTION

The present invention accomplishes the above-stated objectives, as well as others, as may be determined by a fair reading and interpretation of the entire specification.

A water vessel, including at least three closed gas containers fastened into close lateral proximity with a fastening mechanism to define an interstitial hold space between the containers defining a vessel hold. The gas containers preferably include two hull tubes and a cover tube all having substantially circular cross-sections, the cover tube being substantially centered over and nesting on top of and between the two hull tubes; so that the hull tubes provide vessel structure and buoyancy for the vessel to float.

The fastening means preferably is tube fastening means and includes a looped outer skin of sheet wrap material wrapping around the tubes and protecting the tubes from sunlight and from high speed water friction. The hull tubes preferably have upwardly angling hull tube forward ends for defining a bow shape, and preferably have downwardly angling hull tube rearward ends. The hull tubes preferably are laterally spaced apart from each other to increase the size of the hold. The hold preferably includes a hold framework. The at least three tubes preferably are formed of one of rubber and rubberized cloth. The water vessel optionally includes a hull shell fastened underneath and cradling and retaining the hull tubes for adding structural integrity to the vessel and for providing a durable hull of a shape suited to surface characteristics of a body of water to be crossed. The hold preferably includes a rigid tube resting on top of the hull shell between the hull tubes. The at least three-tubes preferably are filled with lighter-than-air gas for increasing buoyancy and thereby reducing the draft of the vessel and reducing drag. The tubes have tube walls and portions of the tube walls bordering the hold preferably are flattened to increase hold volume and to permit the hold to substantially conform in shape to cargo containers.

The water vessel preferably additionally includes an engine drivably connected to two counter-rotating propellers for propelling the water vessel. The water vessel preferably additionally includes an engine and a hydraulic system with a pump driven by the engine and a hydraulic cylinder with a rear thruster shaft extendable from the water vessel for abutting a dock stop structure during rear docking.

A method of assembling the water vessel includes the steps of placing the tubes within the loop of wrap material, at least one of the tubes being in at least partially deflated form, and inflating at least one of the tubes until the tubes bear against the loop of wrap material and cause the loop of wrap material to become taut and grip the tubes with friction engagement. A method of dissembling the water vessel includes the steps of deflating at least one of the tubes until the loop of wrap material become loose and the friction engagement is reduced, and removing the tubes from within the loop of wrap material.

BRIEF DESCRIPTION OF THE DRAWINGS

Various other objects, advantages, and features of the invention will become apparent to those skilled in the art from the following discussion taken in conjunction with the following drawings, in which:

FIG. 2 is a rear or stern view of the ship showing the position of the hold structure relative to the hull tubes and cover tube and showing the hull shell and propeller, and showing the large crane cable winch. The winch rides on rails which extend laterally across the width of the hold structure to line up the winch cable with cargo to be loaded on one side or the other of the hold.

FIG. 3 is a plan side view, and FIG. 4 is a plan rear view of the preferred embodiment of the inventive ship.

FIG. 5 is a broken away perspective view of the cargo hold structure deck showing the winch at the forward end and a rearwardly located ramp.

DETAILED DESCRIPTION OF THE PREFERRED EMBODIMENTS

Figure 1:
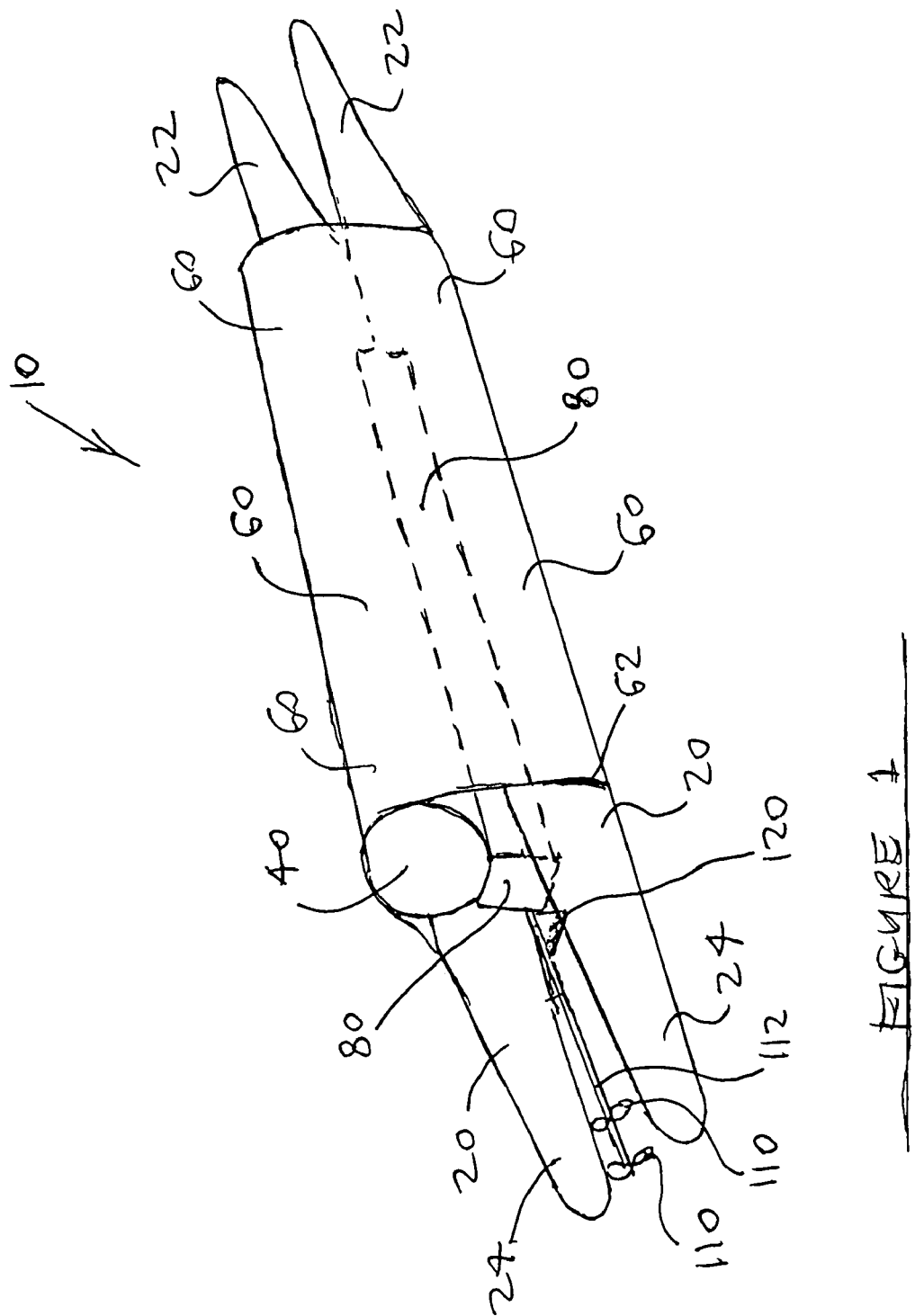
FIG. 1 is a perspective view of the preferred embodiment of the inventive tube ship showing the two hull tubes and the cover tube seated between the hull tubes, with the wrap material wrapped tightly around the tubes.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Reference is now made to the drawings, wherein like characteristics and features of the present invention shown in the various FIGURES are designated by the same reference numerals.

First Preferred Embodiment

Referring to FIGS. 1–5, a vessel or water craft 10 is disclosed, preferably in the form of a ship and constructed of at least three closed gas containers fastened into close lateral proximity to define an interstitial space S between the containers which functions as a ship hold for retaining cargo, crew or passengers. The gas containers preferably are tubes in the form of hull tubes 20 and a cover tube 40 all having substantially circular cross-sections and preferably being fastened together by a looped outer skin of sheet wrap material 60, which also protects the tubes 20 and 40 from damaging sunlight and from high speed water friction.

Hull tubes 20 preferably have upwardly angling hull tube forward ends 22 to approximate the conventional shape of a ship bow and have downwardly angling hull tube rearward ends 24. The two hull tubes 20 rest on the water surface and the cover tube 40 is centered over and nests on top of and between the two hull tubes 20, the hull tubes 20 preferably being laterally spaced apart to increase hold space S. The tubes 20 and 40 thus both form the overall structure of the ship 10 and also provide the necessary buoyancy for the ship 10 to float. It is contemplated that more than three tubes may be clustered around a central hold space S, which preferably contains a framework or wall hold structure 80. The tubes 20 and 40 and the wrap material 60 preferably are both formed of rubber or rubberized cloth.

A hull shell 90 preferably formed of aluminum and is fastened underneath and cradles and retains the hull tubes 20 to add structural integrity to the ship 10 and to provide a rugged, durable hull of a shape suited to the surface characteristics of the body of water to be crossed, such as deep-V or tri-hull. The hull tubes 20 preferably are laterally spaced apart to retain between them a larger hold structure 80 preferably in the form of a rigid square tube which preferably rests on top of the hull shell 80 between the hull tubes 20.

Ordinary buoyancy preferably is increased to extreme buoyancy by filling the tubes 20 and 40 with a lighter-than-air gas such as helium. The buoyancy added by the use of lighter-than-air gas reduces the draft of the ship 10 and thus reduces drag so that the ship 10 can travel at very high speed and hydroplane and can carry a heavier cargo or passenger load with a certain given level of propulsive power. Where the water craft 10 is empty of cargo and its engine is removed, and where the tubes 20 and 40 are filled with lighter-than-air gas, it may be necessary to tie the craft 10 to a suitable anchoring structure (not shown) such as posts to prevent the craft 10 from drifting in the air. Although the tubes 20 and 40 preferably have substantially circular cross-sections, the portions of the tube walls bordering the structure 80 hold preferably are flattened to increase hold structure 80 volume and to permit hold structure 80 sides which conform more closely in shape to ordinary cargo containers such as boxes. The portions of the tube walls preferably are flattened by fastening any suitable light weight flattening material 70 to the tube wall, such as balsa wood, COREX™, or marine plywood.

The ship 10 preferably is driven by two counter-rotating propellers 110 and the ship engine 120 preferably is a turbine. Examples of contemplated ship engines 120 which are believed to be suitable are a GE Lm2500 with estimated 30,000 horsepower, needed for craft performance while carrying a load, or a GE Lm6000 with estimated 55,000 horsepower, needed for rapid increase to and for sustaining the craft 10 at high speed while carrying a load. The engine 120 preferably powers hydraulic cylinder driven, or rack and opinion driven, rear thruster shafts 130 which are extendable from the ship 10 stern for abutting a dock stop structure during rear docking. The rear thruster shaft mechanisms preferably are mounted to the hull shell 90.

A cargo loading crane cable winch 82 and winch cable 88 preferably are provided at the forward end of the hold structure 80, for engaging and drawing cargo items into and along the length of the hold structure 80. FIGS. 2 and 4 show a rear or stern view of the ship 10 showing the position of the hold structure 80 relative to the hull tubes 20 and cover tube 40 and showing the hull shell 90 and propellers 110 on propeller shafts 112, and showing the large crane cable winch 82. The crane cable winch 82 rides on a wheeled trolley 84 on rails 86 which extend laterally across the width of the hold structure 80 to line up the winch cable 84 with cargo items to be loaded on one side or the other of the hold structure 80.

Where the watercraft 10 forms a ship, the tubes 20 and 40 are necessarily large. Examples of contemplated tube diameters are thirty five feet in diameter for the hull tubes 20 fully inflated and fifty-feet in diameter for the cover tube 40 fully inflated. The cover tube 40 is preferably larger in diameter than the hull tubes 20 to fully span, cover and seal above the hold structure 80 space. Examples of contemplated corresponding tube lengths are three hundred feet for the hull tubes 20 and two hundred sixty feet for the cover tube 40. It is believed that these dimensions should permit about two hundred thirty feet of cargo space within the hold structure 80. It is to be understood that these are examples only and many other dimensions and relative proportions are contemplated. The hull tubes 20 preferably are longer than the cover tube 40 so that there is open space at the stern for engine exhaust release.

Method of Assembly and Disassembly

The tubes 20 and 40 preferably are placed in partially deflated form within the loop of wrap material 60 and then are fully inflated to expand within the wrap material until the wrap material 60 becomes taut. The friction between the tubes 20 and 40 and the taut wrap material 60 in most instances is believed to be sufficient to hold the ship 10 structure together, but in certain instances in which it may not be, a chemically soluble adhesive 62 is provided between the tubes 20 and 40 and the wrap material 60. The use of the adhesive 62 is avoided where possible to save weight and also to permit more rapid and efficient servicing. When repair or maintenance is needed, one or more the tubes 20 and 40 can be deflated and a suitable solvent applied to the adhesive 62, if any, so that the tubes 20 and 40 can be disconnected from the hold structure 80 and removed so that either the wrap material 60 or the tubes 20 and 40 can be serviced or replaced. As a result of wear caused by the friction of water against the wrap material 60 at high speed, it is anticipated that the wrap material 60 periodically may have to be replaced to extend the life of the tubes 20 and 40 and thus of the craft 10 itself.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein ar particularly reserved especially as they fall within the breadth and scope of the claims here appended.

I claim:

1. A water vessel, comprising:
   at least three closed gas containers fastened into close lateral proximity with fastening means to define an interstitial hold space between said containers defining a vessel hold, said gas containers comprising two hull tubes and a cover tube all having substantially circular cross-sections, said cover tube being substantially centered over and nesting on top of and between said two hull tubes, such that said hull tubes provide vessel structure and buoyancy for said vessel to float;
   wherein said fastening means is tube fastening means and comprises a looped outer skin of sheet wrap material wrapping around said tubes and protecting said tubes from sunlight and from high speed water friction.

2. The water vessel of claim 1, wherein said hull tubes have upwardly angling hull tube forward ends for defining a bow shape.

3. The water vessel of claim 1, wherein said hull tubes have downwardly angling hull tube rearward ends.

4. The water vessel of claim 1, wherein said hull tubes are laterally spaced apart from each other to increase the size of said hold.

5. The water vessel of claim 1, wherein said at least three tubes are formed of one of rubber and rubberized cloth.

6. The water vessel of claim 1, wherein said tubes have tube walls and portions of said tube walls bordering said hold are flattened to increase hold volume and to permit said hold to substantially conform in shape to conventional cargo containers.

7. A water vessel, comprising:
   at least three closed gas containers fastened into close lateral proximity with fastening means to define an interstitial hold space between said containers defining a vessel hold, said gas containers comprising two hull tubes and a cover tube all having substantially circular cross-sections, said cover tube being substantially centered over and nesting on top of and between said two hull tubes, such that said hull tubes provide vessel structure and buoyancy for said vessel to float;
   wherein said hold comprises a hold framework.

8. A water vessel, comprising:
   at least three closed gas containers fastened into close lateral proximity with fastening means to define an interstitial hold space between said containers defining a vessel hold, said gas containers comprising two hull tubes and a cover tube all having substantially circular cross-sections, said cover tube being substantially centered over and nesting on top of and between said two hull tubes, such that said hull tubes provide vessel structure and buoyancy for said vessel to float;
   and an engine and a hydraulic system with a pump driven by said engine and a hydraulic cylinder with a rear thruster shaft extendable from said water vessel for abutting a dock stop structure during rear docking.

9. A water vessel, comprising:
   at least three closed gas containers fastened into close lateral proximity with fastening means to define an interstitial hold space between said containers defining a vessel hold, said gas containers comprising two hull tubes and a cover tube all having substantially circular cross-sections, said cover tube being substantially centered over and nesting on top of and between said two hull tubes, such that said hull tubes provide vessel structure and buoyancy for said vessel to float;
   and a hull shell fastened underneath and cradling and retaining said hull tubes for adding structural integrity to said vessel and for providing a durable hull of a shape suited to surface characteristics of a body of water to be crossed.

10. The water vessel of claim 9, wherein said hold comprises a rigid tube resting on top of said hull shell between said hull tubes.

* * * * *